United States Patent [19]
Nash

[11] Patent Number: 5,096,143
[45] Date of Patent: Mar. 17, 1992

[54] TAIL UNIT WITH ROTATABLE TAILPLANE

[76] Inventor: William Nash, British Aerospace plc, Warton Aerodrome, Preston, Lancs, England, PR4 1AX

[21] Appl. No.: 559,949

[22] Filed: Jul. 31, 1990

[30] Foreign Application Priority Data

Sep. 4, 1989 [GB] United Kingdom ............... 8919911
Sep. 4, 1989 [GB] United Kingdom ............... 8919919

[51] Int. Cl.$^5$ ............................................. B64C 5/10
[52] U.S. Cl. ............................. 244/87; 244/91; 244/46
[58] Field of Search ............... 244/75 R, 87, 88, 89, 244/76 B, 225, 90 R, 91, 46, 47, 48, 49

[56] References Cited

U.S. PATENT DOCUMENTS

| | | | |
|---|---|---|---|
| 4,037,808 | 7/1977 | Kaniut | 244/89 X |
| 4,163,534 | 8/1979 | Seeger | 244/87 X |
| 4,247,062 | 1/1981 | Brueckner | 244/87 X |
| 4,354,646 | 10/1982 | Raymer | 244/87 |
| 4,538,779 | 9/1985 | Goldstein | 244/87 |
| 4,542,866 | 9/1985 | Caldwell et al. | 244/45 |

FOREIGN PATENT DOCUMENTS

| | | |
|---|---|---|
| 322775 | 7/1989 | European Pat. Off. ............... 244/87 |
| 425645 | 3/1935 | United Kingdom . |
| 575471 | 2/1946 | United Kingdom . |
| 799290 | 8/1958 | United Kingdom . |
| 820009 | 9/1959 | United Kingdom . |
| 1075403 | 7/1967 | United Kingdom . |

OTHER PUBLICATIONS

U.K. Patent Office Search Report, GB 8919911.1, Apr. 20, 1991.

Primary Examiner—Joseph F. Peters, Jr.
Assistant Examiner—Carla Mattix
Attorney, Agent, or Firm—Nixon & Vanderhye

[57] ABSTRACT

The tailplane 6 is mounted to an aircraft by a spigot 7 and is also rotatable about the spigot 7 to provide aerodynamic control. At the same time the tail plane is pivotable about an axis extending generally parallel to the longtudinal axis of the aircraft in order to optimise the tail plan configuration for various speeds.

2 Claims, 5 Drawing Sheets

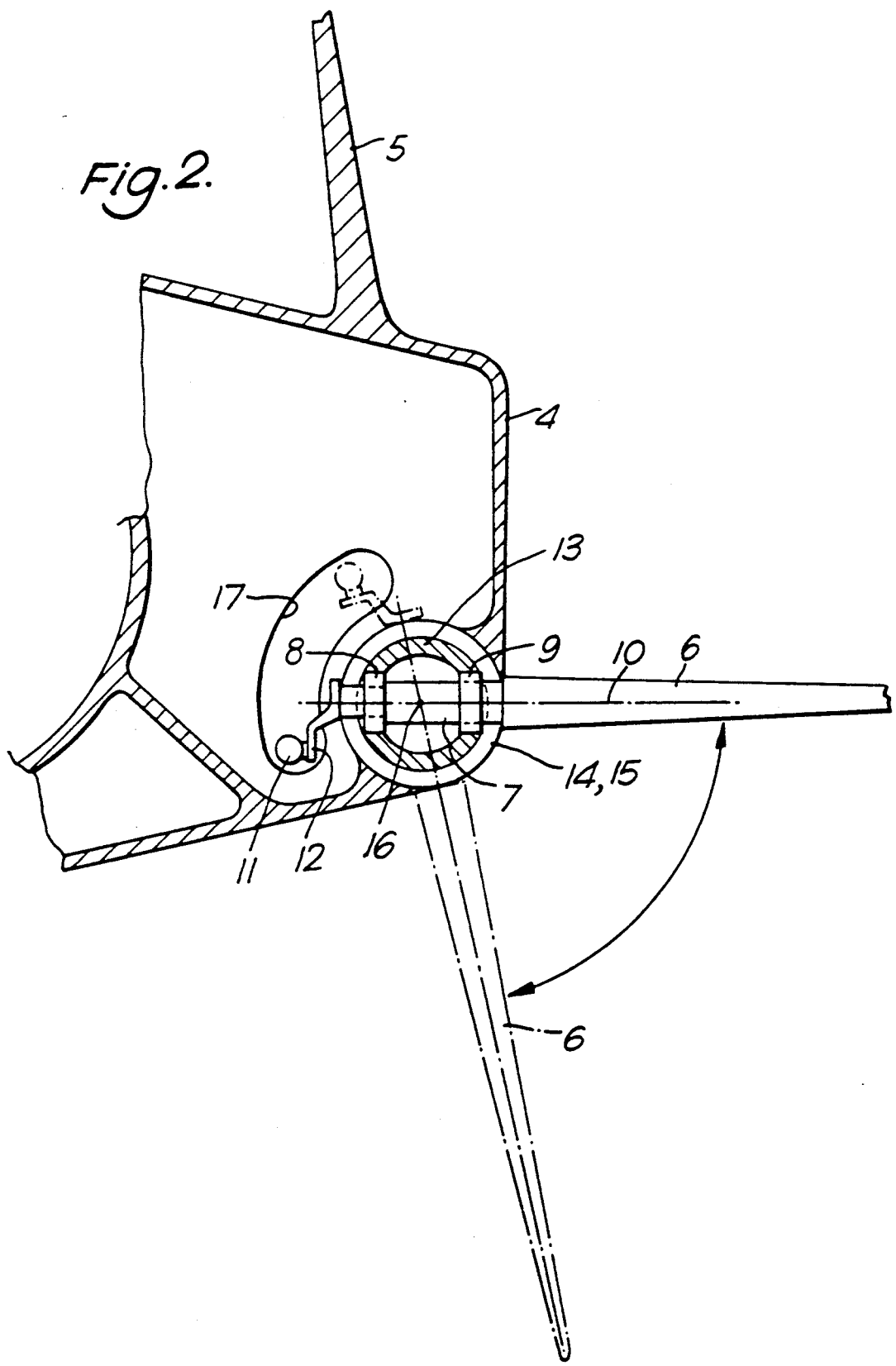

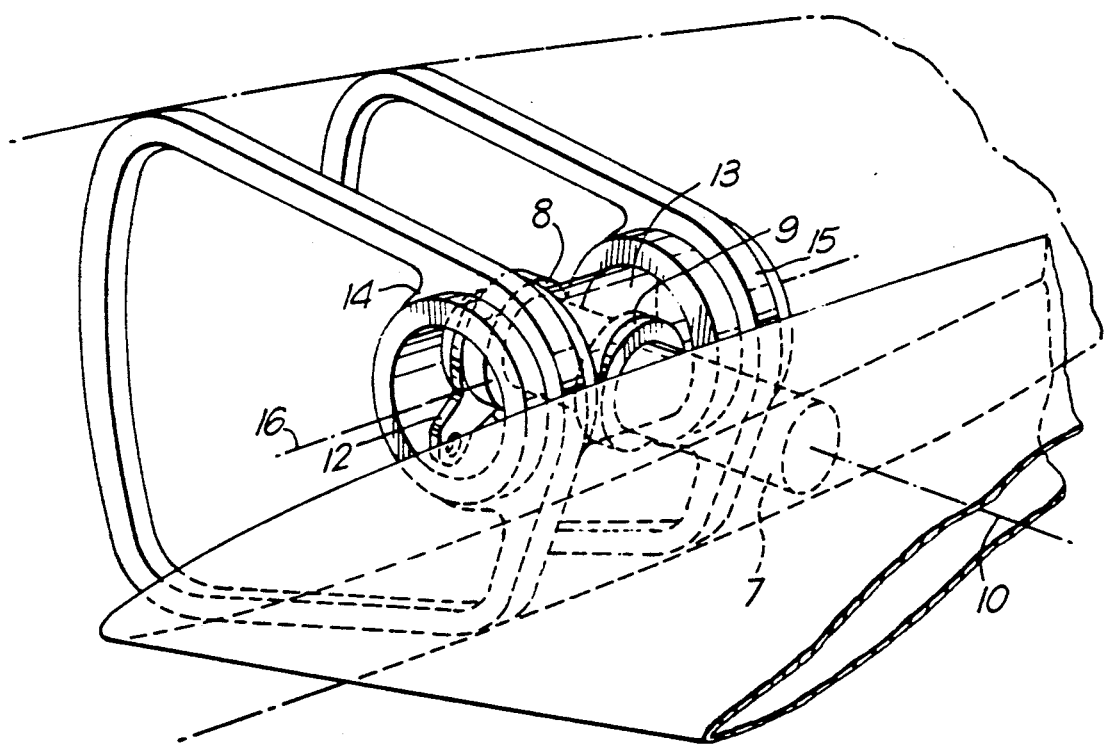

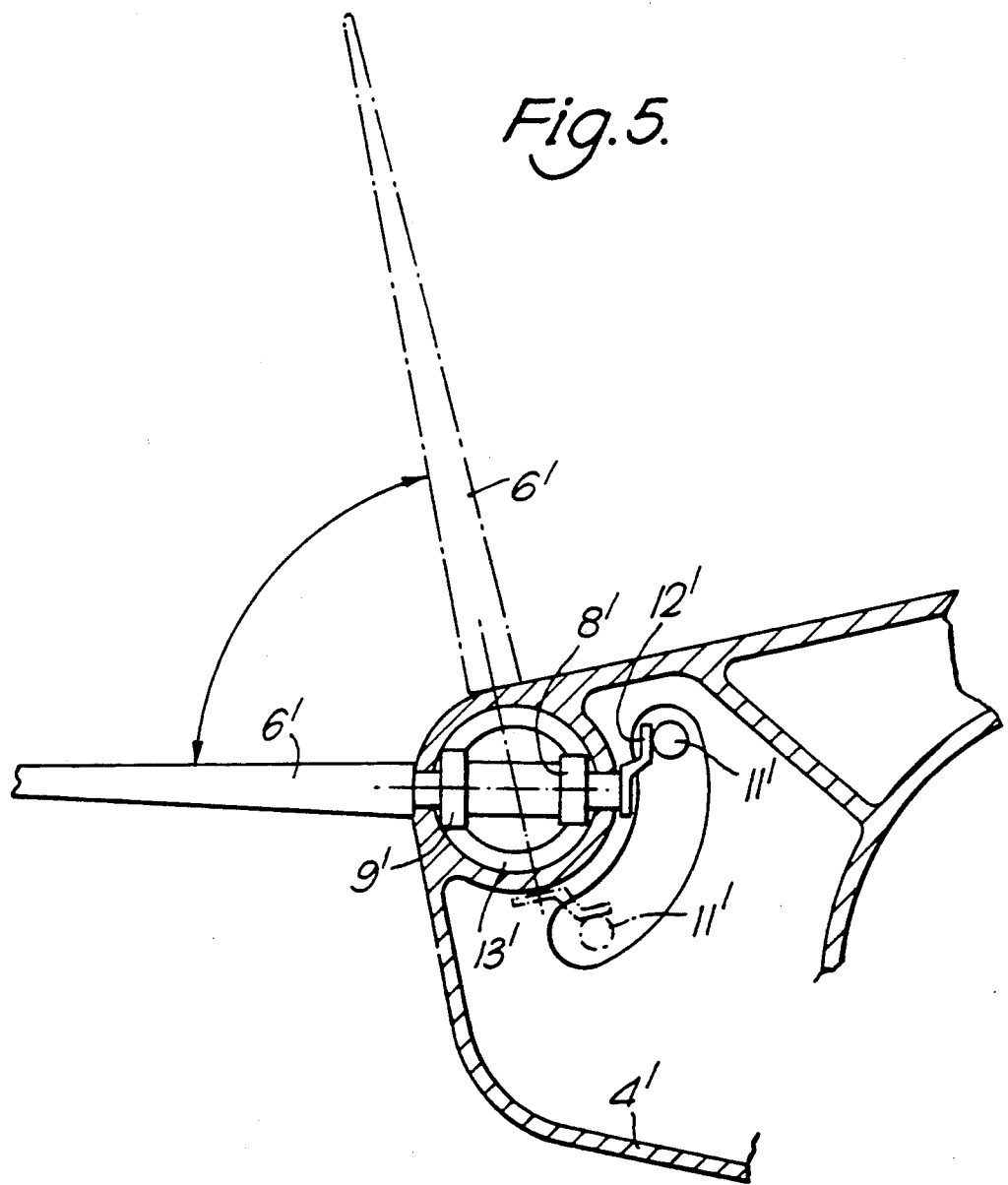

TAIL UNIT WITH ROTATABLE TAILPLANE

BACKGROUND OF THE INVENTION

This invention relates to a tail unit for an aircraft.

The tail unit of an aircraft, which conventionally comprises a vertical fin and a pair of generally horizontal tailplanes, is a critical component with regard to the aircraft's performance and handling characteristics. Accordingly, the design of the tail unit is of considerable importance.

Unfortunately, the requirements for the tail unit vary substantially between low and high speed situations. At low speeds the horizontal tailplanes are important for the stability and control of an aircraft; at high speeds, however, they are substantially unnecessary and only serve to increase drag. This means that for high-speed, especially supersonic, aircraft a choice has to be made between designing the tail unit for high-speed flight, in which case the aircraft may be unstable during take-off and landing, or for low-speed performance. In practice the design tends to be an uneasy compromise between these extremes.

Accordingly it would be desirable to be able to vary the tail configuration in response to aircraft speed, but at the same time the tail plane must be operable to provide conventional aerodynamic control.

STATEMENT OF THE INVENTION

According to the present invention there is provided a tail unit for an aircraft comprising at least one tail plane extending from the fuselage of said aircraft and characterised by means for permitting rotation of said tail plane about two substantially perpendicular axes; a first axis substantially parallel to the fuselage and a second axis substantially parallel to the span of the tail plane.

By means of this arrangement the position of the tailplane may be varied in response to the speed of the aircraft. In particular, during take-off and landing the tail plane may be horizontal but can be pivoted about the second axis into a vertical position at high-speed. In addition, the tail plane can be pivoted about the first axis at all times to provide conventional aerodynamic control.

In a preferred arrangement, the aircraft has a fixed generally vertical fin and said tail plane is pivotable between a substantially horizontal position and a generally vertical position in which said tail plane acts as a supplementary fin.

In a particularly preferred embodiment the tail plane may be fitted to the aircraft fuselage by a spigot rotatably mounted in a first pair of bearings for rotation about said first axis, said first bearings forming part of a trunnion mounting rotatable in a second pair of bearings about said second axis.

It should be noted that in this specification the terms 'vertical' and 'horizontal' relate to an aircraft in level flight and should be construed accordingly.

BRIEF DESCRIPTION OF THE DRAWINGS

An embodiment of the invention will now be described by way of example and with reference to the accompanying drawings, in which:

FIG. 2 is a transverse section through a tail unit showing the tailplane in its extreme positions, FIG. 3 is a schematic perspective view of a mechanism for moving the tailplane.

FIG. 5 is a view corresponding to FIG. 2 of a second embodiment.

DESCRIPTION OF THE PREFERRED EMBODIMENTS

Figure 1A:
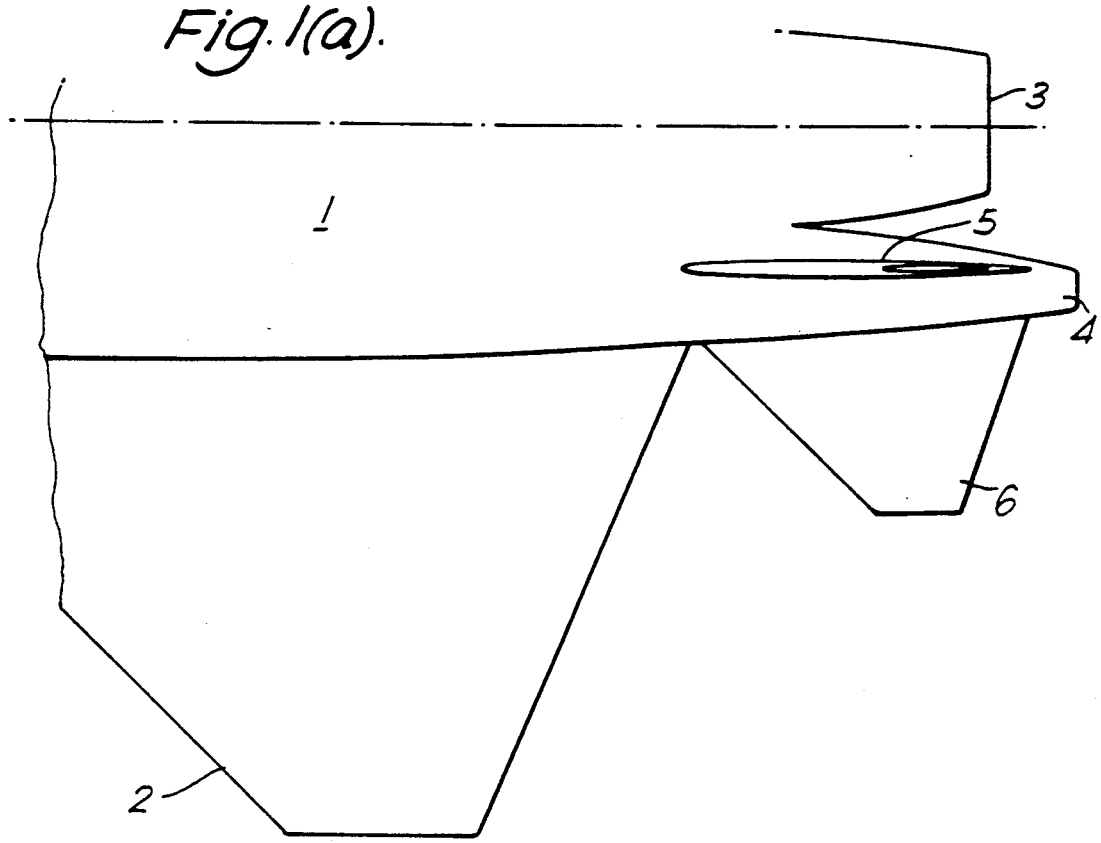
FIGS. 1(a) and (b) are plane and side views respectively of part of an aircraft.
Figure 1B:
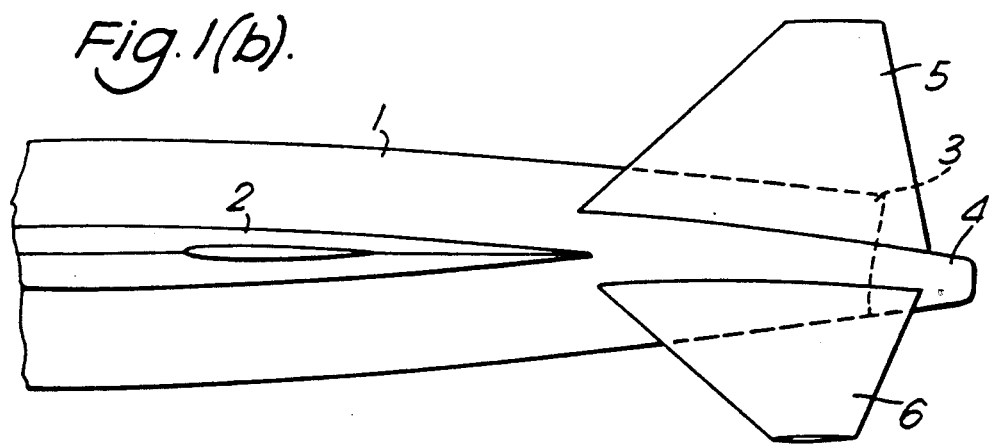

Referring firstly to FIGS. 1(a) and (b) there is shown schematically a part of the rear section of an aircraft. The aircraft has a fuselage 1, a pair of wings 2 (of which only one is shown), engine outlet 3, and twin tail booms 4 on either side of the engine outlet 3 (only one being shown). The invention would, however, be equally applicable to a standard rear fuselage. Each tail boom 4 has mounted thereon a vertical fin 5 and a tailplane 6 extending outwardly of the aircraft. In a conventional aircraft the positions of the fins and tailplane would be fixed as part of the design and would be subject to the disadvantages mentioned above. The fin 5 would be generally vertical and the tailplane 6 substantially horizontal (including the possibility of the tailplane being fixed at a slight dihedral).

Figure 4:
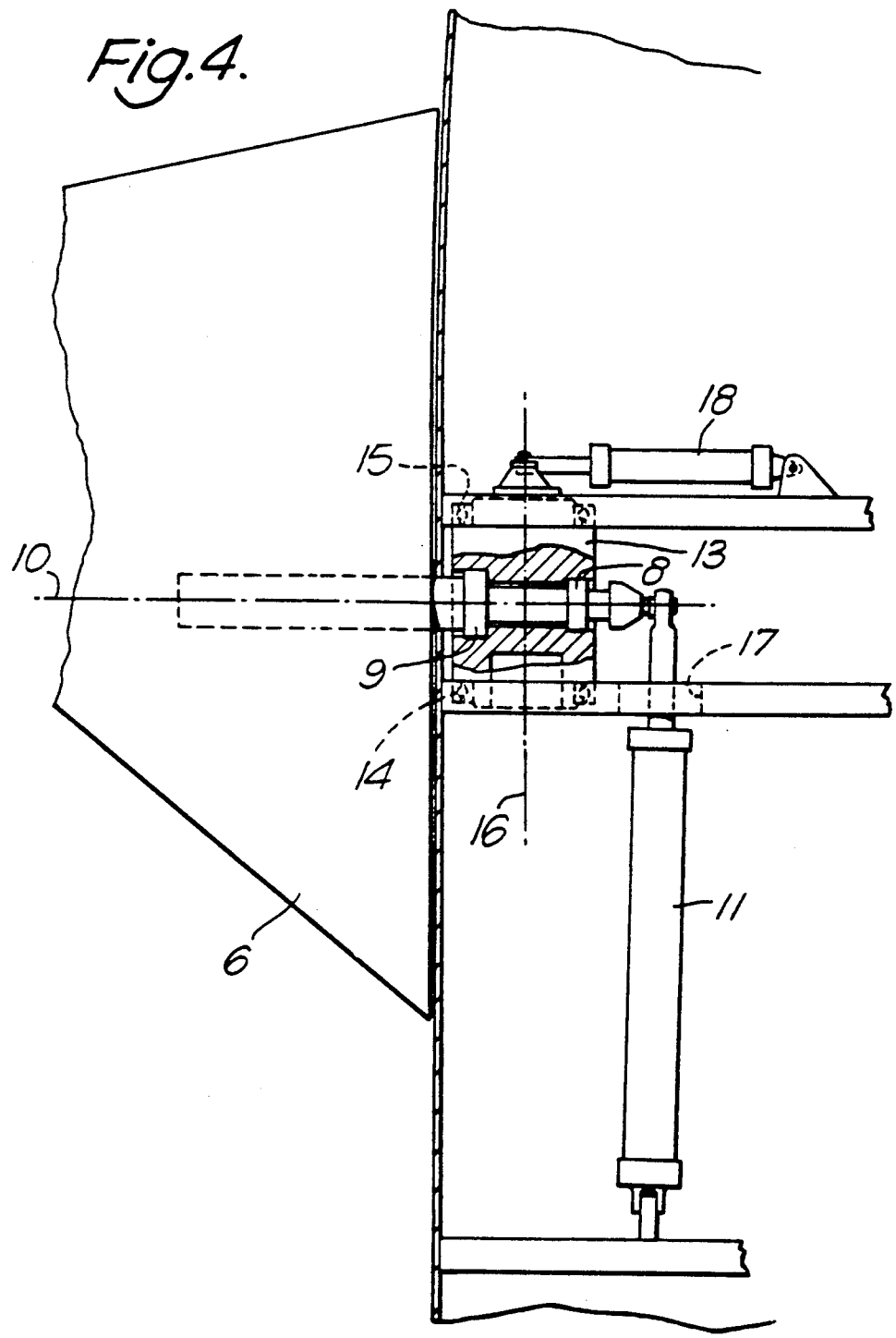
FIG. 4 is a schematic plan view of such a mechanism.

In the present invention, however, the tailplane 6 is pivotally mounted on the fuselage so that it may move between vertical and horizontal positions. This is illustrated in FIG. 2, with a possible mechanism being shown in FIGS. 3 and 4. Referring to FIG. 2 there is shown a section through a tail boom 4. The tail boom has a relatively angular section, and the tailplane 6 is mounted to the boom in the region of a lower corner of the section. The tailplane 6 is fitted to the boom 4 by means of a spigot 7 rotatably mounted in a pair of bearings 8, 9 to allow the tailplane to be rotated about an axis 10 extending along the span of the tailplane to provide necessary aerodynamic control. Rotation of the tailplane 6 is effected by an actuator 11 acting upon a lever 12 fitted to the end of the spigot 7.

To enable the tailplane 6 to pivot between its horizontal and vertical positions, in direction of the arrows in FIG. 2, the spigot bearings 8, 9 are themselves formed as part of a trunnion mounting 13 that rotates in bearings 14, 15 formed as an integral part of the boom structure at the corner of the boom. This trunnion mounting enables not only the tailplane 6 and spigot 7 to rotate about axis 16 (which extends normal to the paper in FIG. 2), but also the control lever 12 and the end of actuator 11 that acts upon lever 12 to rotate in the space defined between the bearings 14, 15. The other end of the actuator 11 is fixed at such a point that the geometry of the actuator 11 and lever 12 is only minimally changed by rotation of the tailplane about axis 16. This enables the tailplane 6 to be rotated about axis 10 for control purposes at any point during rotation of the tailplane about axis 16. To allow for this movement of the control lever 12 and actuator a slot 17 is defined in any transverse structural bulkhead.

Rotation about axis 16 may be effected in a number of ways. For example, a control lever similar to lever 12 may be provided at either end of the trunnion mounting 13 and acted upon by a second actuator 18. Alternatively the surface of the trunnion mounting may be provided with gearing to allow the trunnion to be rotated by a drive gear.

The above described rotation of the tailplane has a number of advantages. As discussed above the position of the tailplane may be optimised for the speed of the aircraft, with the tailplane being moved from its horizontal to vertical position as the speed of the aircraft increases. In addition, since the tailplane acts as a supplementary fin, the fixed fin 5 may be made smaller than would otherwise be the case. This not only helps reduce the weight of the tail unit, but the smaller fin 5 presents a smaller radar return. Furthermore, since in its vertical position the tailplane 6 lies in the same plane as the fin 5, the fin and tailplane will effectively comprise a single flat surface for radar reflection, which further serves to provide a stealth aspect. An additional stealth-related advantage of the present invention is that the fin and tailplane (when vertical) will shield, at least to a certain extent, the infra-red signal of the engine outlet.

A pivotable tail plane as described about may form part of other types of tail units. For example, the vertical fin may be dispensed with and the necessary stabilisation may be obtained by pivoting upwardly a pair of opposed tail planes to vary the dihedral angle. FIG. 5 illustrates such an embodiment in which the tailplane 6 is pivotable from a generally horizontal position to an upwardly directed substantially vertical position, or of course any position therebetween, by a mechanism corresponding to that of the first embodiment, but located in an upper corner of the rear fuselage. Corresponding elements of the mechanisms are illustrated by corresponding reference numerals in FIGS. 2 and 5.

We claim:

1. An aircraft control system, said aircraft having a fuselage, said control system comprising:
    at least one tailplane having a span;
    means for rotatably attaching said tailplane to a rear portion of said fuselage, said rotatably attaching means comprising a spigot and a first pair of bearings located within said fuselage for rotatably mounting said spigot;
    a first actuator for rotating said spigot about a first axis;
    a trunnion including and mounting said first pair of bearings;
    a second actuator;
    a second pair of bearings for rotatably mounting said trunnion for rotation about a second axis substantially perpendicular to said first axis, said second axis substantially parallel to said fuselage and said first axis substantially parallel to said span of said tailplane.

2. The aircraft control system of claim 1 wherein said fuselage includes at least one fixed generally vertically fin and said tailplane is rotatable about said second axis from a substantially horizontal position to a substantially vertical position at which time said tailplane acts a supplementary vertical fin.

* * * * *